J. B. PAYNE.
SPRING VEHICLE WHEEL.
APPLICATION FILED MAY 1, 1916.
1,258,444.
Patented Mar. 5, 1918.
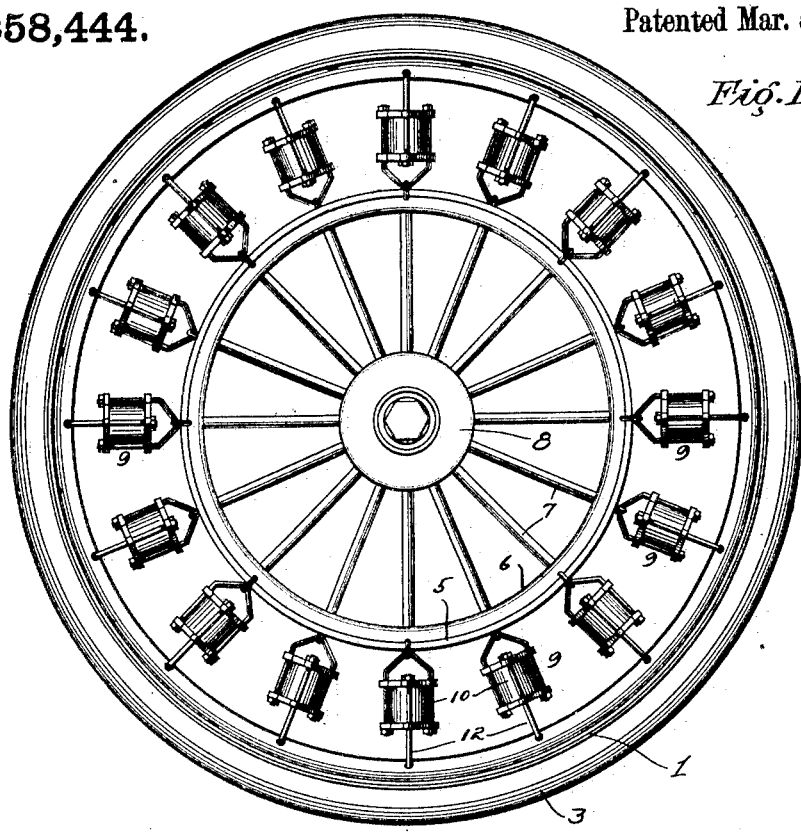
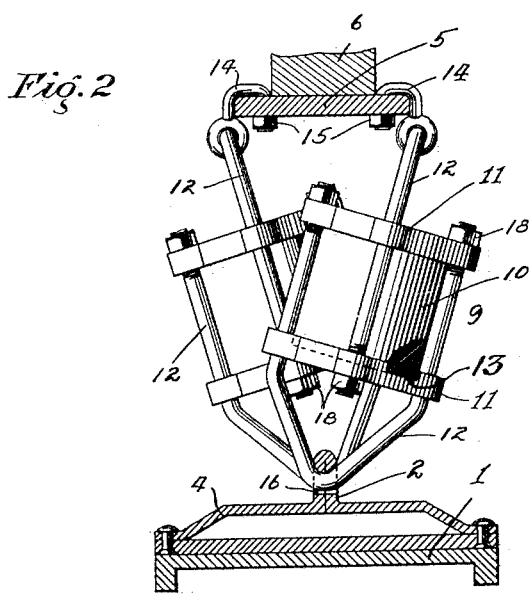
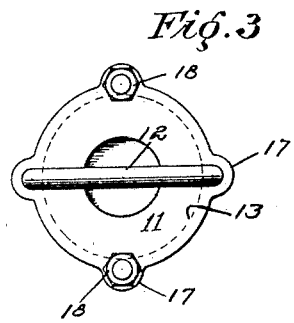
INVENTOR.
James B. Payne
BY
Harry C. Schroder
ATTORNEYS.

UNITED STATES PATENT OFFICE.

JAMES B. PAYNE, OF RICHMOND, CALIFORNIA.

SPRING VEHICLE-WHEEL.

1,258,444.　　　　Specification of Letters Patent.　　　Patented Mar. 5, 1918.

Application filed May 1, 1916. Serial No. 94,674.

*To all whom it may concern:*

Be it known that I, JAMES B. PAYNE, a citizen of the United States, residing at Richmond, in the county of Contra Costa, and State of California, have invented certain new and useful Improvements in Spring Vehicle-Wheels, of which the following is a specification.

This invention relates to improvements in vehicle wheels and more particularly to a wheel having an auxiliary inner rim and a plurality of resilient members interposed between the auxiliary rim and the outer rim whereby a certain amount of yielding is secured between the two parts.

Another object of my invention is to so construct the wheel that the inner portion is securely held against axial movement with respect to the outer rim, at the same time not sacrificing any of the resilient qualities.

Another object of my invention is to provide a slight resilient effect between the inner and outer rims in the direction of rotation whereby the variations in speed are partly taken up by the resilient members, reducing the shocks on the engine and tendency to slip on the part of the tire.

With these and other objects in view my invention consists in the novel construction, combination and arrangement of parts herein illustrated and more specifically pointed out in the appended claims.

Reference being had to the accompanying drawing forming a part of this specification, Figure 1 is a view in side elevation of my improved wheel.

Fig. 2 is an enlarged sectional view through the two rims showing in detail the manner of securing the resilient members to these rims.

Fig. 3 is a view in plan of the cap between which the resilient member is secured.

Referring to corresponding parts in the several views by the same numerals of reference, 1 denotes the outer rim having secured thereto a tire 3. On the back of this rim is secured a band 4 having a central rib 2 to which the various resilient members are secured and at the same time provide an additional reinforcement to the band. The inner rim is denoted by 5 and secured thereto is a felly 6, from which radiates spokes 7 to the central hub 8. Denoted in general by 9 are the resilient members illustrated in detail in Fig. 2. These members are disposed in approximately radial relation with respect to the wheel body and in an angular manner between the band 4 and the outer edge of rim 5 thereby securing the inner rim against axial motion with respect to the outer rim.

It will be noted that adjacent members are attached to the opposite side of rim 5 thereby holding the latter against lateral movement in both directions. Each member comprises a block of resilient material 10, such as rubber, held between metallic caps 11, these caps comprising a circular plate having openings through which pass the yoke members 12. These caps are open in the center so that the dust and dirt may work through the same and are provided with a shallow recess 13 in which the rubber block is seated.

Adjacent the edge of rim 5 are provided the eye bolts 14 each having its shank bent as shown in detail in Fig. 2. This shank extends through a suitable opening in the rim and is fastened thereto by means of a nut 16. Through the eye of this bolt passes one of the yoke members 12 the other which passes through a suitable opening 15 in the rib 2. The rubber block 10 is placed between these yokes and the nuts 18 tightened so as to place this block in position under some initial tension.

Having thus described the various parts of my invention, the operation is as follows:

When passing over an obstruction and the wheel drops into a rut the weight of the vehicle will compress the rubber blocks in members 9 in the upper part of the wheel, while those in the lower will merely cause the disk 11 to slide on the arms of the yoke member 12. The amount of initial tension in the blocks 10 being sufficient to take up any difference in the distance between these disk members. In like manner if a wheel strikes an obstruction which tends to throw the wheel upwardly, this tendency is taken up by the compression of the lower resilient members in the same manner as just described for those on the upper part. It will thus be apparent that various shocks which are normally transmitted to the hub of the vehicle are absorbed or reduced by means of these resilient members 9. The wheels being simple in construction having few parts and these parts being of such construction that they are readily placed I have provided a device which is superior to the pneumatic tires in use at the present time.

While I have shown and described the preferred construction and embodiment of my invention it will be understood that minor changes may be made in detail and design within the scope of the claims without departing from the spirit of the invention.

I claim as new and wish to cover by Letters Patent:

1. A vehicle wheel comprising a wheel body having an inner rim, an outer rim concentric thereto having a rib on its inner face, yoke members disposed in approximately radial relation to the wheel body and attached to said rims in normally inseparable relation, and resilient devices for cushioning said yokes.

2. A vehicle wheel comprising a wheel body having an inner rim, having eyes at its edges arranged in staggered relation, a concentrically disposed outer rim having a rib on its inner face provided with openings, resilient devices interposed between said rims, and disposed in approximately radial relation with respect to the body of the wheel, and means for connecting said resilient devices with the eyes of the inner rim and the openings of the outer rim in normally inseparable relation.

3. A vehicle wheel comprising a wheel body having an inner rim, having eyes at its edges arranged in staggered relation, a concentrically disposed outer rim having a rib on its inner face provided with openings, yoke members attached to said eyes and to said openings in normally inseparable relation, and cushioning members for said yokes, said yoke members being disposed in approximately radial relation with respect to the wheel body.

4. A vehicle wheel comprising a wheel body having an inner rim, eye bolts attached to said rim in staggered relation, a concentrically disposed outer rim having a rib on its inner face, yoke members disposed in approximately radial relation to the wheel body and attached to said eye-bolts and to said rib in normally inseparable relation, and cushioning devices for said yokes.

5. A vehicle wheel comprising a wheel body having an inner rim, eye-bolts attached to said rim in staggered relation, a concentrically disposed outer rim having a rib on its inner faces, yoke members disposed in approximately radial relation to the wheel body and attached to said eye-bolts and to said rib in normally inseparable relation, bearing plates attached to the respective yokes, and cushioning devices between the bearing plates of the respective pairs of yokes.

In testimony whereof I affix my signature.

JAMES B. PAYNE.

Copies of this patent may be obtained for five cents each, by addressing the "Commissioner of Patents, Washington, D. C."